United States Patent Office 2,925,326
Patented Feb. 16, 1960

2,925,326

METHOD OF PROCESSING PHOSPHORUS SLUDGE

Hans Pieper and Hans Ebert, Knapsack, near Cologne, and Günther Breil, Hurth, near Cologne, Germany, assignors to Knapsack-Griesheim Aktiengesellschaft, Knapsack, near Koln, Germany, a corporation of Germany No Drawing. Application October 30, 1956
Serial No. 619,128

Claims priority, application Germany November 10, 1955

5 Claims. (Cl. 23—165)

This invention relates to a method of processing phosphorus sludge obtained in the form of an aqueous phosphorus emulsion, for example, with the use of water by precipitating previously dust-freed phosphorus vapours from a phosphorus reduction furnace.

It is known that a thermal reduction of phosphates with the use of coal in an electric furnace or a shaft furnace gives rise to a simultaneous evolution of carbon monoxide and phosphorus vapor. These gases are advisably freed from dust and the phosphorus vapor is then condensed in known manner at a temperature above the dew point of phosphorus by spraying with water. This effect may be considerably increased by mechanical means, for example, a high power mixer or a centrifugal washing apparatus to obtain yellow phosphorus. The presence of certain volatile impurities, such as silicon tetrafluoride, or pulverulent solid impurities in these gases implies the separation of a more or less great quantity of yellow phosphorus in the form of an aqueous emulsion that floats on the surface of the coherent phosphorus melt. This emulsion is stabilized by the aforesaid impurities and is an extraordinarily stiff sludge that can only with much difficulty, if at all, be converted into a coherent phosphorus melt even at a temperature within the range of about 60° C. and about 80° C.

The further processing of this phosphorus sludge by a known process and its utilization imply considerable expenditure of time and energy. In this case, the yellow phosphorus contained in the sludge must be isolated by means of a steam expulsion or, inversely, the water contained in the sludge is eliminated by evaporation under reduced pressure at a temperature immediately below the boiling point of the phosphorus. In this latter case, the impurities must be removed by a further after-treatment, for example, by filtration.

Now, we have found a method of processing aqueous phosphorus sludge which enables all the aforesaid disadvantages to be avoided. The sludge is added to pure, liquid and yellow phosphorus to obtain a mixture consisting of at least about 50% of the pure yellow phosphorus added. The mixture so obtained is then burned in the usual manner and like yellow pure phosphorus to obtain phosphorus pentoxide. The phosphorus pentoxide so obtained may be hydrated with the necessary quantity of water to form a phosphoric acid which may be diluted to a desired concentration by the addition of a further quantity of water.

The process herein described enables the phosphorus contained in a phosphorus sludge to be utilized in a simple manner without isolation from the sludge, and this contrary to the known processes wherein the phosphorus has to be isolated in a very disadvantageous manner, and furthermore enables a separate preparation of the phosphorus sludge to be dispensed with.

As a general principle, any type of a phosphorus sludge may be mixed with pure, yellow phosphorus and then burned. An aqueous phosphorus sludge generally contains between about 25% and about 75% of phosphorus and, accordingly, between about 25% and about 75% of water, in addition to about 2% to about 4% of solid impurities. It is, however, advantageous to use a phosphorus sludge which contains between about 40% and about 60% of phosphorus and, accordingly, between about 40% and about 60% of water in addition to about 2% of solid impurities.

The upper limit of the processable sludge portion in the mixture of phosphorus sludge and phosphorus is about 50%. It must, however, be noted that the consistency of the phosphorus sludge may vary within wide limits depending on the nature of the crude phosphate used. Hence, it is possible that in the case of some phosphates the use of a homogeneous mixture of 50% of pure yellow phosphorus and 50% of phosphorus sludge is no longer associated with a smooth burning operation. The end mixture must, however, be able at a corresponding temperature of being pumped and burned like pure, yellow phosphorus to form phosphorus pentoxide. As follows, the upper limit of 50% of the phosphorus sludge proportion varies depending on the consistency of the sludge. Generally, the mixing proportion of phosphorus sludge to pure phosphorus is within the range of about 1:1 and about 1:10, and preferably about 1:5.

The aqueous phosphorus sludge is advisably washed out with water while avoiding an additional adsorption of water and this prior to being mixed with the pure, liquid and yellow phosphorus. During this operation, which is carried out prior to the homogenization, no additional water is absorbed by the sludge, since the specific gravities of the three liquid layers, i.e. phosphorus, phosphorus sludge and water, differ very much from one another.

The aqueous phosphorus sludge is then mixed with the pure yellow phosphorus at a temperature above the melting point of yellow phosphorus, preferably at a temperature between about 80° C. and about 90° C. This latter temperature of 90° C. displays an especially favorable effect in preparing the above mixture since the viscosity of liquid phosphorus decreases with an increasing temperature.

Yellow phosphorus is stored in the liquid form together with the sludge in heated storage tanks which are kept at a constant temperature by means of a heating jacket. In these tanks, the pure, yellow phosphorus or the mixture of phosphorus and phosphorus sludge is covered with a water layer to prevent the access of air. To obtain a homogeneous mass of phosphorus and phosphorus sludge, mixing is performed according to this invention by stirring or injecting an inert gas into the phosphorus and phosphorus sludge layers. The two layers of phosphorus and phosphorus sludge may be stirred only so intensively that, while avoiding a turbulent flow, both layers are intimately mixed with one another, but remain unmixed with the covering water layer. This may be achieved during the mixing operation by using a slowly operating blade stirrer. Such stirrer enables the phosphorus sludge which floats on the phosphorus melt to be intimately mixed with the yellow phosphorus with formation of a homogeneous dispersion of the sludge in the liquid phosphorus.

When the homogeneous mixture obtained is allowed to stand for some hours, the sludge separates again as an individual layer above the phosphorus and has now approximately the same composition as at the outset. On the other hand, it is advisable that the aqueous phosphorus sludge mixed with the pure, yellow phosphorus be burned to form phosphorus pentoxide while constantly maintaining the homogeneity of the mixture. The sludge disperses finely in the phosphorus so that the water adhering to said sludge is also introduced into the furnace, It should also be noted that the mixture must be kept in a fairly homogeneous state during the entire burning operation.

The homogeneous mixture of aqueous phosphorus sludge and pure phosphorus that is to undergo a burning process should advisably be introduced into the furnace at a temperature of between about 80° C. and about 90° C. and burned at that temperature to form phosphorus pentoxide. Pure yellow phosphorus alone is normally burned at a temperature as indicated above so that the burning conditions are identical.

As follows, the temperature applied during the mixing operation is maintained during the loading operation and the burning process itself. It is understood that pure yellow phosphorus or a mixture of phosphorus and phosphorus sludge is more difficult to burn at a temperature lower than indicated above since the viscosity of both substances is higher at such lower temperature. Contrary thereto, the application of a lower temperature does not involve a separation of the mixture into phosphorus sludge and phosphorus so that the pumpability of the whole mixture is warranted even at such a lower temperature.

The mixture is burned to form phosphorus pentoxide, then hydrated and optionally diluted with water to form an acid. This acid contains small amounts of solids which derive from the sludge and can be separated in any desired manner, for example by filtration. In this respect it must be stressed that a phosphoric acid produced according to this invention from a mixture of yellow phosphorus and a phosphorus sludge which has previously been washed out, does not differ qualitatively from a phosphoric acid produced from pure phosphorus.

The process of this invention offers the particular advantage that for processing the sludge it need not be isolated, for example by skimming, for the sludge stored in a heatable tank is not removed, but is burned together with pure phosphorus and, like this latter substance itself, without necessitating additional apparatus to be used.

The following examples serve to illustrate the invention, but they are not intended to limit it thereto:

*Example 1*

15 tons of yellow phosphorus containing 99.9% of phosphorus are stirred for 6 hours at a temperature of about 80° C. to 90° C. with 15 tons of a phosphorus sludge which contains, for example, about 40% to 60% of phosphorus, about 2% to 4% of solid impurities and about 40% to about 60% of water, with formation of a homogeneous mixture. The mixture so obtained is then burned in known manner at a temperature above the melting point of phosphorus, preferably at 80° C. to 90° C., to form phosphorus pentoxide which is then hydrated with the necessary amount of water to obtain a phosphoric acid which is then diluted to a desired concentration by the addition of a further quantity of water.

*Example 2*

30 tons of pure yellow phosphorus containing 99.9% of phosphorus are stirred for 4 hours at a temperature of 80° C. to 90° C. with 6 tons of a sludge containing, for example, 40% of phosphorus, about 2% of solid impurities and about 60% of water, with formation of a homogeneous mixture. Like pure yellow phosphorus, the mixture so obtained is then burned in known manner at a temperature above the melting point of phosphorus, preferably at 80° C. to 90° C. to form phosphorus pentoxide which is then hydrated with the necessary quantity of water to obtain a phosphoric acid which is diluted to a desired concentration by the addition of a further quantity of water.

*Example 3*

20 tons of yellow pure phosphorus containing 99.9% of phosphorus are stirred for 2 hours at a temperature of 80° C. to 90° C. with 2 tons of a sludge which contains, for example, 25% of phosphorus, up to about 4% of solid impurities and between about 70% and 75% of water, with formation of a homogeneous mixture. Like pure yellow phosphorus, the mixture so obtained is burned in known manner at a temperature above the melting point of phosphorus, preferably of 80° C. to 90° C., to form phosphorus pentoxide which is then hydrated with the necessary quantity of water to give a phosphoric acid which can be diluted to a desired concentration by the addition of a further quantity of water.

We claim:

1. The method of converting to phosphorous pentoxide the phosphorous contained in the stiff aqueous phosphorus sludge layer obtained in the thermal reduction of phosphorus containing ore which comprises thermally reducing phosphorus containg ore and thereby obtaining a phosphorus vapor stream; condensing said phosphorus vapor stream by spraying with water in the absence of oxidizing conditions; collecting resulting condensate and allowing it to separate as an intimate three phase system comprising a lower layer of substantially pure yellow liquefied elemental phosphorus, an intermediate phosphorus sludge layer which is an aqueous dispersion of elemental phosphorus and solid impurities and an upper protective water layer; homogeneously mixing said phosphorus sludge layer containing from about 25 to 75% by weight of elemental phosphorus, from about 75 to 25% by weight of water and from about 2 to 4% by weight of solid impurities with at least an equal weight of the substantially pure, yellow liquefied elemental phosphorus of the lower layer of the same condensate; oxidizing the phosphorus content of said homogeneous mixture to phosphorus pentoxide at a temperature of about 80 to 90° C., and maintaining the mixture in its homogeneous condition during the oxidation step.

2. The process of claim 1 wherein the proportion by weight of substantially pure yellow liquefied elemental phophorus admixed with the intermediate phosphorus sludge layer of the same condensate is between about 1:1 to about 10:1.

3. The process of claim 1 wherein the intermediate phosphorus sludge layer is washed with water without substantially affecting the final water content thereof and prior to homogeneously mixing with the substantially pure yellow liquefied elemental phosphorus of the same condensate.

4. The process of claim 1 wherein the intermediate phosphorus sludge layer and the substantially pure yellow liquefied elemental phosphorus of the same condensate are homogenized by bubbling a nonreactive gas through said layers while avoiding disturbance of the protective aqueous layer covering the mixture.

5. The process of claim 1 wherein the intermediate phosphorus sludge layer contains about 40 to 60% by weight of phosphorus, 60 to 40% by weight of water and about 2 to 4% by weight of solid impurities, and wherein the substantially pure yellow liquefied elemental phosphorus of the same condensate is mixed with said intermediate phosphorus sludge layer in a ratio of about 1:1 to 5:1.

References Cited in the file of this patent

UNITED STATES PATENTS

| | | |
|---|---|---|
| 1,990,233 | Hechenbleikner | Feb. 5, 1935 |
| 2,020,976 | Udy | Nov. 12, 1935 |
| 2,221,770 | Almond | Nov. 19, 1940 |